United States Patent [19]

Purtell et al.

[11] Patent Number: 4,664,316

[45] Date of Patent: May 12, 1987

[54] STEERABLE IRRIGATION SYSTEM

[76] Inventors: Rufus J. Purtell; Jack L. Purtell, both of P.O. Box 1152, Brownfield, Tex. 79316

[21] Appl. No.: 816,137

[22] Filed: Jan. 3, 1986

[51] Int. Cl.$^4$ .......................... A01G 25/09; B05B 3/18
[52] U.S. Cl. .................. 239/735; 137/899.1; 239/1; 239/744
[58] Field of Search .................. 239/709–722, 239/177.1, 177.2, 178; 137/899, 899.1; 180/190, 732, 733, 735, 737, 739, 740, 743, 744, 746, 747

[56] References Cited

U.S. PATENT DOCUMENTS

| | | | |
|---|---|---|---|
| 3,746,258 | 7/1973 | Purtell | 239/720 |
| 3,802,627 | 4/1974 | Seckler et al. | 239/177.2 |
| 3,897,801 | 8/1975 | Purtell | 239/720 |
| 3,902,668 | 9/1975 | Daugherty et al. | 239/177.1 |
| 4,033,508 | 7/1977 | Jacobi et al. | 239/177.2 |
| 4,352,460 | 10/1982 | Purtell | 239/720 |
| 4,531,604 | 7/1985 | Lamer | 180/140 |

Primary Examiner—Andres Kashnikow
Assistant Examiner—Kevin Patrick Weldon
Attorney, Agent, or Firm—Wendell Coffee

[57] ABSTRACT

A linear irrigation system has the wheels on each end angled outward to stretch the entire pipe. Some of the vehicles in the middle of the pipe are steered responsive to the distance the elongated pipe is from a guide line. Steering is controlled by the movement of a cable. Bridges upon a tube on the cable are used to activate a microswitch. The microswitch itself is on a carriage which is responsive to the distance of the elongated pipe from a guide line. Therefore when any correction is needed, a predetermined correction is applied and no additional correction is applied until the carriage carrying the microswitch is again moved. The wheels are individually steered. The correction is almost instantaneous and is not dependent upon changing the angle of the entire moving pipe.

11 Claims, 8 Drawing Figures

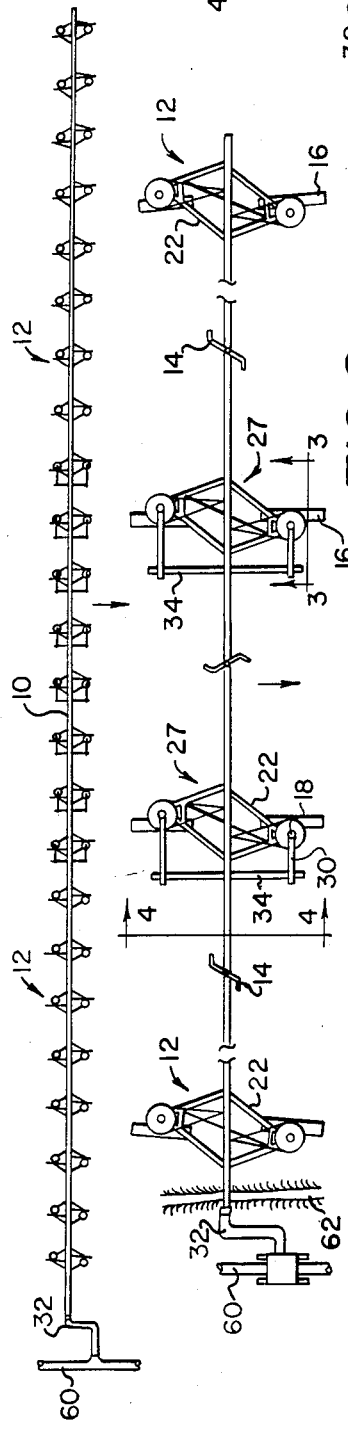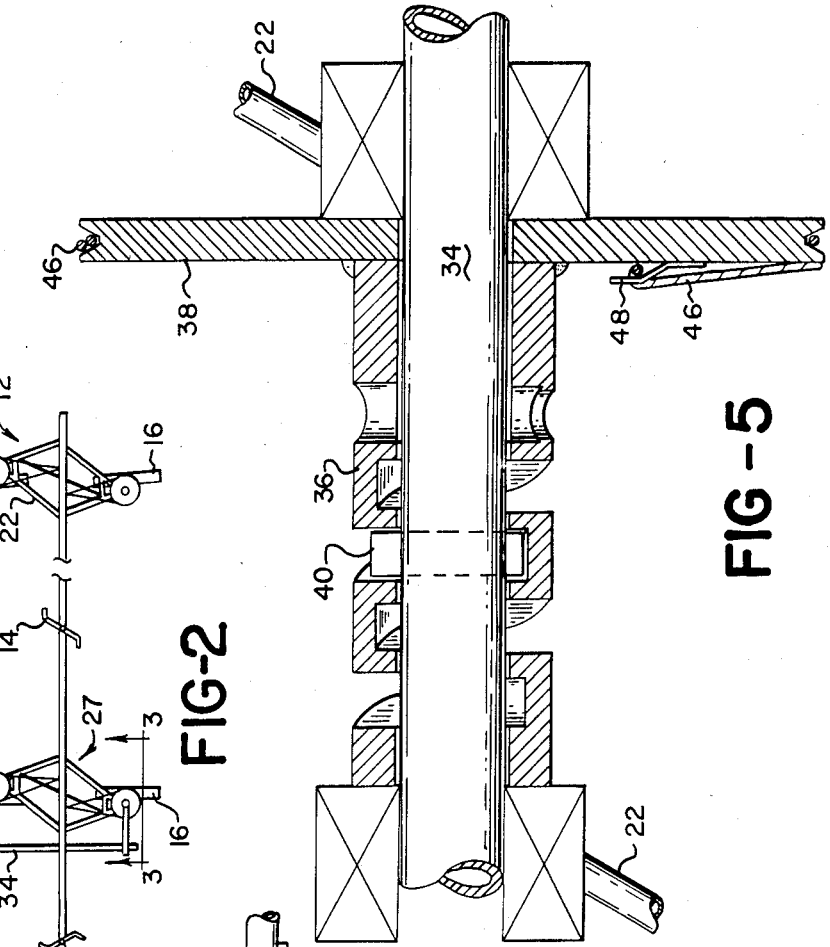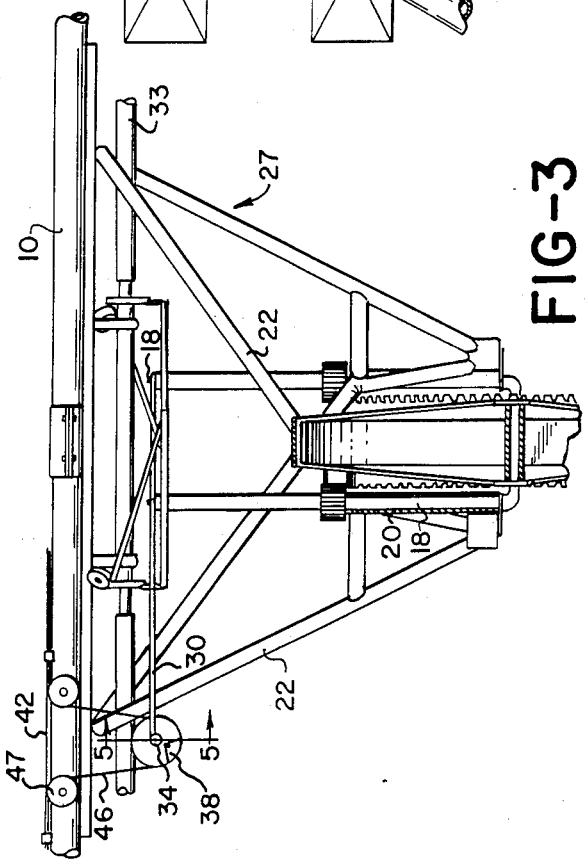

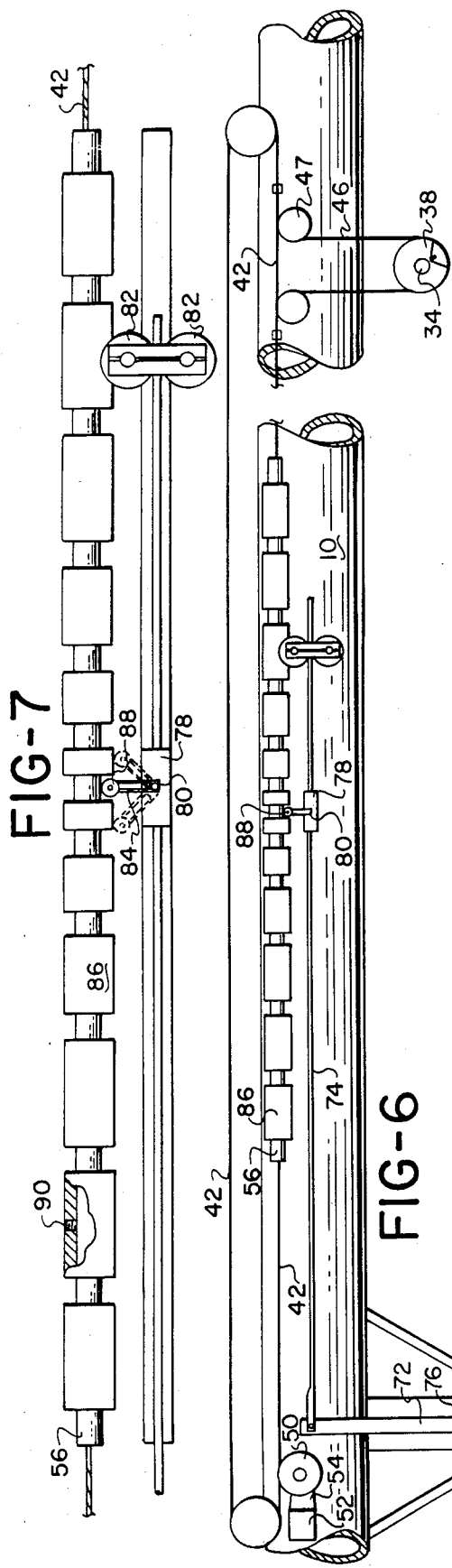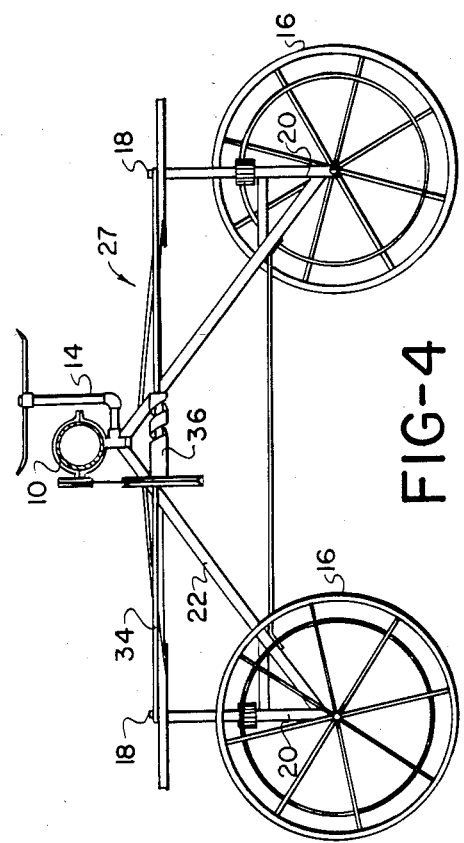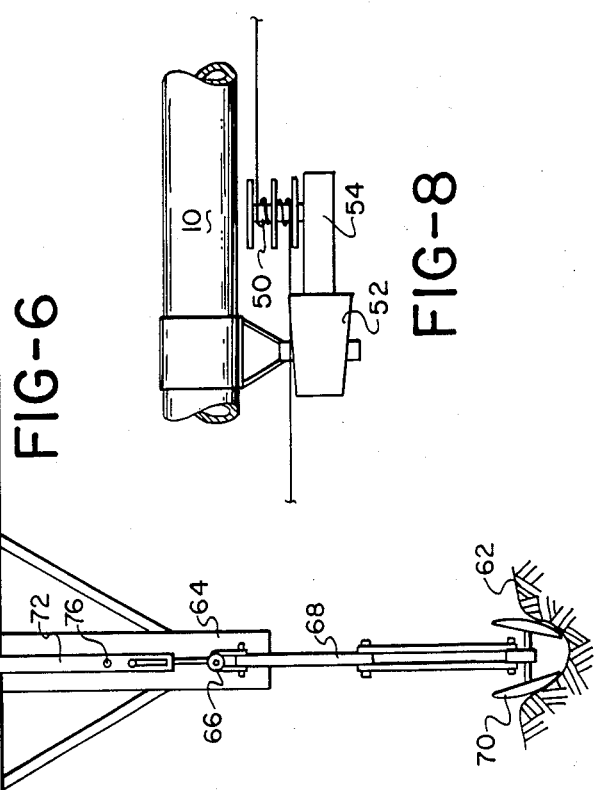

STEERABLE IRRIGATION SYSTEM

CROSS REFERENCE TO RELATED APPLICATIONS

None. However, applicant filed Disclosure Document No. 134,375 on Feb. 24, 1985 which document concerns this application.

BACKGROUND OF THE INVENTION (1) Field of the Invention

This invention relates to agricultural irrigation and more particularly to linear systems wherein a pipe is moved transversely of its axis rectalinearly across the field to be irrigated and water dispensed from that pipe.

(2) Description of the Prior Art

The prior Purtell U.S. Pat. No. 4,352,460 (referred to as Purtell No. '460) discloses an automatic irrigation system having an automatic furrow guide. In that system the distance of the pipe from a guide line in the form of a furrow was maintained by changing the angle of the entire elongated pipe. That is to say if the pipe was away from the guide line that the far end of the pipe was made to go faster so that the pipe angled toward the guide line to come nearer to it.

Johnson U.S. Pat. No. 4,172,551 discloses a guide system for a linear move irrigation system.

Purtell U.S. Pat. Nos. 3,245,595 and 3,245,608 (referred to as Purtell No. '595 and '608) discloses an irrigation system wherein the elongated pipe is supported by a plurality of vehicles. The wheels on each vehicle may be steered from right to left. The wheels are hand set to go in one particular direction and locked in that position by a leaf fitting into a notched bar.

Purtell U.S. Pat. No. 3,897,801 (referred to as Purtell No. '801) discloses a system where one or more of the end vehicles supporting an elongated pipe are angled outward so that the end vehicles stretch the entire pipe. The wheels on the vehicle are the same as those disclosed in Purtell Nos. '595 and '608.

Purtell U.S. Pat. No. 3,746,258 (referred to as Purtell No. '258) discloses rotation of a helical tube to move a shaft axially of the tube.

Before this application was filed, a search was made in the U.S. Patent and Trademark Office. That search developed the following patents:

Engel U.S. Pat. No. 2,750,228
Zimmerer U.S. Pat. No. 3,730,435
Daugherty U.S. Pat. No. 3,902,668
Olson U.S. Pat. No. 4,132,244
Chapman U.S. Pat. No. 4,343,935
Gheen U.S. Pat. No. 4,350,295

SUMMARY OF THE INVENTION (1) New Function and Different Function

According to this invention the distance from the guide line to the elongated pipe is controlled or maintained by steering the wheels of several of the middle vehicles.

Basically wheel units according to Purtell Nos. '595 and '608 have a steering arm attached to the upright king pin so that the wheels are steered. About 24 vehicles support the elongated pipe. About four end vehicles on each end are angled outward to stretch the pipe (as shown in Purtell No. '801). Then four to twelve steerable vehicles in the center of the pipe are used to steer the pipe. If it is desired to move the pipe to the right, the center vehicles are steered to the right. The steered wheels will overcome the traction of the end wheels on the left end and the angled wheels on the extreme right end will pull the entire elongated pipe to the right. Likewise to move the elongated pipe to the left, the center wheels are angled to the left. The steered wheels will equalize or overcome the thrust of the wheels permanently angled on the right and the angled wheels on the extreme left will pull the system to the left.

If a guide line is established near the supply end or the guide end of an elongated pipe then it is possible to measure the relationship of the guide end to the guide line and therefore steer some center vehicles according to this information. A loop control cable extending from the guide end is connected by a mechanical advantage to the tillers or steering arms of the four guided vehicles.

The control cable is wound and unwound from a windlass drum by an electric motor which is controlled by the deviation between the guide end of the pipe and the guide line.

Thus, it may be seen that the total function of our invention far exceeds the sum of the functions of the individual parts such as cables, king pins, guide lines etc.

(2) Objects of this Invention

The object of this invention is to irrigate agricultural fields.

Further objects are to achieve the above with a device that is sturdy, compact, durable, lightweight, simple, safe, efficient, versatile, ecologically compatible, energy conserving, and reliable, yet inexpensive and easy to manufacture, install, adjust, operate and maintain.

Other objects are to achieve the above with a method that is versatile, ecologically compatible, energy conserving, rapid, efficient, and inexpensive, and does not require skilled people to install, adjust, operate, and maintain.

The specific nature of the invention, as well as other objects, uses, and advantages thereof, will clearly appear from the following description and from the accompanying drawing, the different views of which are not scale drawings.

BRIEF DESCRIPTION OF THE DRAWINGS

FIG. 1 is a top plan schematic representation of a system according to this invention.

FIG. 2 is a top plan view of four of the vehicles of the system; schematic in nature.

FIG. 3 is a front elevational view of the upper portion of one of the steering vehicles taken substantially on line 3—3 of FIG. 2.

FIG. 4 is a side elevational view of one of the steering vehicles taken as a cross section of the pipe substantially on line 4—4 of FIG. 2, with many parts not shown for clarity.

FIG. 5 is a sectional view of the helical tube taken substantially on line 5—5 of FIG. 3.

FIG. 6 is a front elevational view of the guiding mechanism and a portion of the control mechanism.

FIG. 7 is an enlarged detail of the bridge tube and the microswitch together with the fixed bridges.

FIG. 8 is a top view of the windlass drum.

As an aid to correlating the terms describing this invention to the exemplary drawing the following catalog of elements is provided:

Catalog of Elements

10—elongated pipe
12—vehicles
14—sprinklers
16—wheels
18—king pin
20—tube
22—frame
27—steering vehicles
30—steering arm
32—supply or guide end
33—shaft
34—tie rod
36—helix tube
38—steering sheave
40—pin
42—cable or steering link
46—splice cable
47—guide sheaves
48—fasteners
50—drum, windlass
52—electric motor
54—transmission
56—bridge tube
60—fixed pipe
62—guide lines
64—leg
66—pivot pin
68—guide arm
70—furrow disc or guide
72—control arm
74—control pitman
76—control arm pivot
78—control carriage or controller
80—microswitch
82—rollers
84—switch arm
86—bridge
87—wires
88—bridge roller
90—set screw

DESCRIPTION OF THE PREFERRED EMBODIMENT

As may be seen in the drawing, elongated pipe 10 is supported by a plurality of vehicles 12.

The pipe is shown with sprinklers 14 which are a means for dispersing water onto the field. The particular sprinklers are shown as illustrative only and it will be understood that the water could be dispensed from drop tubes close to the ground without sprinkling. Each of the vehicles 12 is substantially according to the vehicles as disclosed in the Purtell Nos. '595 and '608. Vehicles of this nature are known art and commercially available on the market. Each of the vehicles will have two ground engaging wheels 16 which are journaled about an axle. The axle is from the same rod as king pin 18. The king pin 18 is journaled within upright tube 20 upon frame 22 of the vehicle 12 rotating or moving the king pin 18 in the tube 20 will steer or move the wheel 16.

The verner plate on the frame 22, as shown in Purtell No. '595, has a plurality of notches. By putting a leaf in the notch, the wheel 16 can be locked in a fixed angular position relative to the vehicle 12 and thus to the pipe 10. Particularly as disclosed in Purtell Pat. No. '801, the end vehicles are fixed so that the angular position at which they are so fixed is such as to place the elongated pipe 10 in tension.

On the supply or guide end 32 of the elongated pipe 10 there are means for supplying the water under pressure to the pipe. This has been shown schematically in FIG. 2 but those having skill in the art will understand that it could be a trolley as disclosed in Purtell No. '460 or Purtell U.S. Pat. No. 3,444,941. Power means is supplied to move the system in the direction of the arrows of FIGS. 1 and 2. Shaft 33 is part of the power means.

Also those having ordinary skill in the art will recognize that the equipment described to this point is conventional and the equivalent to this equipment is commercially available on the market.

The center steering vehicles 27 (which are the guided vehicles) are modified. First a smooth plate is attached to the verner plate so that the leaves do not enter any of the notches so that the king pin is not restrained from rotation by the verner plate leaf combination.

Steering arm 30 is attached as by welding to the top of the king pin 18 and extends parallel to the elongated pipe 10. The steering arm on the front and back wheel will extend to the same side. For conveniene one end of the pipe is called the supply or guide end 32. The arms 30 are seen to be extending in the direction of the guide end. The distal ends of the arms 30 from the front and back king pin 18 are connected by tie rod 34. Helix tube 36 is telescoped over the tie rod near the center thereof. Steering sheave 38, coaxial with the helical tube 36 and the tie rod 34, is attached as by welding to the helical tube 36. Pin 40 extends through the tie rod 34 and into a helical internal groove of the helix tube. The helix tube is identical to the helical tube as disclosed in Purtell No. '258.

Steering link in the form of cable 42 extends along the pipe 10 from the guide end 32 and along the steering vehicles 27. Splice cable 46 extends from the main cable 42 around guide sheaves 47 and over the steering sheave 38. The splice cable 46 is wound two or three revolutions around the steering sheave. Splice cable 46 is connected into fastener 48 near the hub of the steering sheave 38.

Analysis will shown that movement of the steering link or cable 42 will rotate the steering sheave 38 and thus the helical tube 36. One full rotation of the helical tube 36 will move the tie rod 34 fully to one extreme of the center. The tie rod will have a total of two inches travel; one inch to either side of center.

If the steering sheave 38 is about nine inches in diameter, then about 28 inches of the cable 42 movement will move the tie rod from center position to an extreme position and about 56 inches of cable movement will move the tie rod 34 from one extreme position to the other. The number of degrees by which the king pin 18 and thus the wheel 16 will be steered or angles will be dependent upon the length of the steering arm 30. If the steering arm is about 28 inches in length, then about one inch of movement in the tie rod 34 will result in about two degrees angling or turning of the wheel 16. Thus about 28 inches of cable 42 movement will result in 2 degrees angular movement of the king pin 18 and wheel 16. Therefore, movement of the steering link or cable 42 will result in simultaneously steering the wheels 16 of the steering vehicles 27. This simultaneous steering of the wheels will cause the elongated pipe 10 to have a component of movement axially or along its length as explained above in the Summary of the Invention.

Double windlass drum 50 is mounted on pipe 10 near the guide end 32. The cable 42 is wound on the windlass drum 50 in a right hand fashion on one side and a left hand fashion on the other and therefore rotation of the windlass drum will move the cable along its length. The drum 50 is rotated by electric motor 52 through speed reducing transmission 54. Bridge tube 56 is telescoped over the cable 42 and securely attached to it near the guide end 32 adjacent the drum 50.

The elongated pipe 10 is designed to move along fixed pipe 60. Means for transferring water under pressure from the fixed pipe to the elongated pipe are provided. Typical of such means are shown in Purtell No. '941 or Purtell No. '460. Guide line 62 is established along the fixed pipe. It will be understood that several types of guide lines can be used. The preferred form is to use a furrow as shown in Purtell Pat. No. '460. Those with ordinary skill in the art will understand that other means could be used as sources of signal as shown in Daugherty et al, U.S. Pat. No. 3,902,668 or Johnson, U.S. Pat. No. 4,172,551.

Near the guide end 32 of the pipe, depending leg 64 extends downward from the elongated pipe 10. It is attached to the pipe by clamps. Near the bottom of the leg there is horizontal pivot pin 66. The pin has an axis which is traverse to the elongated pipe 10. Guide are 68 is pivoted to the pivot pin 66. Furrow follower discs 70 are mounted on the bottom of the guide arm 68. The discs 70 form a guide on the guide line 62 and the leg 64 is part of the means for moving the guide.

The top of the guide arm 68 is pivoted to control arm 72. The top of the control arm is pivoted to control pitman 74. The control arm 72 is pivoted to the leg 64. The guide arm 68 and the control arm 72 are so constructed and preportioned so that when the furrow disc 70 moves one inch in one direction that the top of the control arm 72 and thus the control pitman 74 moves about four inches in the same direction as the furrow disc.

When the leg 64 is vertically over the guide line 62, the center position of control carriage 78 will be directly beneath the center of the bridge tube 56 upon the cable 42, when the steering wheels 16 of the vehicles 27 are straight ahead. Control carriage or controller 78 carrying microswitch 80 is mounted for linear movement aligned with the elongated pipe 10. This is accomplished by having one end of the control pitman 74 guided between a pair of rollers 82. Therefore if the distance is large between the control carriage 78 and the control arm 72, the motion of the control carriage will be substantially linear.

The switch 80 has switch arm 84 which in the normal position extends straight up. If it comes in contact with a bridge 86 upon bridge tube 56 it will move to the right or to the left depending upon whether the control carriage was moving to the left or to the right. Depending upon whether the arm moves to the left or to the right, electrical connection by wires 87 (FIGS. 7 and 8, not shown in FIG. 6 for clarity) is made either in direct fashion or reverse fashion connecting a source of DC power to the electric motor 52. Thus, if the arm moves in one direction it will cause the electric motor to rotate the windlass drum 50 in one direction. If the arm moves to the other direction, it will cause the electric motor 52 to rotate the windlass drum 50 in the opposite direction.

As previously explained, rotation of the windlass drum 50 will cause the cable 42 to move and therefore the bridge tube 56 attached to the cable. The electrical connections are connected so that movement of the arm 84 to the left causes the bridge tube 56 to move to the left. Movement of the switch arm 84 to the right causes the bridge tube 56 to move to the right. Movement of the control 78 to the right will cause the arm 84 to move to the left. There are a plurality of collars, cuffs, or bridges 86 upon the bridge tube 56. As illustrated all of the bridges are not the same length. The equipment is designed and adjusted so that there is a spaced between adjacent bridges 86. The distance from the microswitch to the bridge tube 56 is such that the switch arm 84 and bridge roller 88 upon the switch arm will fit within the spaces between bridges 86.

Therefore if the position of the control carriage 78 and the bridge tube 56 is such that the roller 88 is in a space the switch arm 84 will extend vertically upward and there will be no electrical connection to the electric motor 52 and therefore there will be no movement of the cable 42. The steering arms 30 will hold the wheels 16 in fixed position.

The bridge tube 56 has been illustrated with the steering wheels straight ahead and therefore the bridge tube 56 is centered over the control carriage 78. Therefore in this condition the elongated pipe 10 moves at right angles to its length.

If the guide line 62 moves one way or the other relative to the pipe 10 because of a change of the terrain or other reasons, the furrow disc 70 will through its connection cause the control carriage 78 to move. The guide arm 68 and control arm 72 are a part of a means for detecting a deviation of the distance of the guide end 32 from the guide line and also they are part of a means for moving the control 78 responsive to the deviation. Upon movement of the control carriage the bridge roller 88 will come into contact with one or the other of the bridges 86 upon the bridge tube 56 causing the switch arm 84 to activate the microswitch 80. Upon the activation of the microswitch the cable 42 will move until the switch arm 84 is again at a space between two bridges 86.

Each of the bridges 86 is telescoped over the bridge tube 56 and fixed in place by set screw 90. The bridges 86 may be any width. If a one inch bridge inch were used then two or three bridges could be jammed against one another so that the total length was two inches or three inches.

The operation can be analyzed that the distance between the guide end 32 and the depending leg 64 is a predetermined horizontal distance between the guide end and the guide line 62.

Analysis will show that if the actual distance from the guide end 32 of the pipe deviates from the predetermined distance from the guide line 62 that this will cause a movement of the control 78. This movement will cause the motor 52 to move the bridge tube 56 until the bridge roller 88 gets to the next gap or space between bridges. That is to say that when the deviation of the elongated pipe 10 reaches a predetermined amount so that the roller 88 contacts the edge of one of the bridges 86 that a predetermined amount of correction will be applied to the steering wheels 16. The deviation before correction is taken is determined by the width of the spaces between bridges 86. The predetermined correction is according to the length of the bridges 86. Analysis of the system will show that if the bridges are about three inches long that each of the wheels 16 will be turned about one third a degree by the king pin 18.

It will be understood that this application is addressed to one having ordinary skill in the art.

Many of the parts and elements that would normally be found in irrigations systems have neither been shown in the drawings or described in the specifications since one having ordinary skill in the art would understand these parts. For example, the system for keeping all the vehicles in straight alignment has not been shown nor does the alignment method used by the equipment interact or modify the scope of this invention. This invention corrects the limitations and restrictions that uneven and irregular terrain impose on irrigations systems.

Also, the particular systems for keeping the system at a predetermined angle other than 90 degrees to the guide line has not been shown. The specific structure for providing the water under pressure from the fixed pipe 60 into the elongated pipe 10 is not shown, nor does it affect this invention.

The steering system is entirely independent of the angle the elongated pipe runs to the guide line. That is, to a limited degree the elongated pipe could be run at an angle other than 90° to its length and the distance to the fixed supply pipe controlled by the steering of the wheels. This allows a system to operate on terrain that otherwise would be unsuitable. That is, it could run on hilly or sloping or undulating terrain. Further, longer elongated pipes than are now in service can be operated with this system.

The control method and means being dependent upon both the steering link and the guide could be used to control other aspects of the system. That is, an embodiment of the control invention could be used to control the angle of the elongated pipe.

Other parts have not been shown in detail. For example: the connection of the steering arms 30 to the tie rods 34; or the connection of the idle pulleys for the loop of cable 42; or the wiring from switch 80 to motor 52 to a source of DC power are all within the skill of an ordinary agricultural mechanic.

The embodiment shown and described above is only exemplary. we do not claim to have invented all the parts, elements, or steps described. Various modifications can be made in the construction, material, arrangement, and operation, and still be within the scope of our invention.

Obviously, the system described is entirely a mechanical system wherein the guide is a mechanical guide transmitting the deviation material to the controller mechanically and the interrelationship of the controller to the cable link is also mechanical, the change of position of the cable link being electrical.

Those with ordinary skill in the art will understand that the system could be almost entirely electrical. I.e., the guide line could be a nonmechanical guide line such as a laser beam or a wire carrying an electromagnetic field. Then the guide that moves along the guide line could be light sensitive to the laser beam or sensitive to the electromagnetic field produced by the wire. Intelligent information could be transmitted to the controller, e.g., microchip, which could change the condition. Then, the steering link could also be a wire carrying intelligent information to the wheels, and the input from the wire fed through microprocessors, i.e., computers, and the steering link changed responsive to the condition of the controller and the steering link. On each vehicle, the steering could be done by an electrical motor connected to the king pin.

Another example could be a hydraulic system where the steering was done by a hydraulic motor such as a cylinder and piston type motor connected to the king pin. The steering link could be hydraulic, etc.

Another system could be a hybrid system using partial electrical controls and partial hydraulic controls and also mechanical parts such as the guide and guide line could be mechanical, the control and steering link electrical, and the actual steering hydraulic.

The restrictive description and drawing of the specific examples above do not point out what an infringement of this patent would be, but are to enable one skilled in the art to make and use the invention. The limits of the invention and the bounds of the patent protection are measured by and defined in the following claims.

I claim as my invention:

1. In the process of operating an automatic irrigator which includes:
   a. releasing water from an elongated pipe upon a field to be irrigated,
   b. supporting said elongated pipe by a plurality of vehicles, each vehicle having wheels,
   c. moving said vehicles and said elongated pipe traversely of the pipe's length through the field,
   d. supplying water to a supply end of said elongated pipe from a fixed pipe;
   dd. also moving the elongated pipe along and at a certain angle to the fixed pipe,
   e. establishing a guideline along the fixed pipe,
   f. predetermining a preferred distance between the elongated pipe and the guideline, and
   g. determining the deviation of the preferred distance from the actual distance between the elongated pipe and the guideline, the improved method of controlling the vehicles to reduce the deviation comprising the steps of:
   h. simultaneously steering the wheels of some of the vehicles in response to a change in the determined deviation, so that the elongated pipe moves axially as well as traversely, thereby reducing the determined deviation while maintaining the certain angle.

2. The invention as defined in claim 1 further comprising:
   i. angling the wheels at the ends of the elongated pipe outward to stretch the pipe.

3. In the process of operating an automatic irrigator which includes:
   a. releasing water from an elongated pipe upon a field to be irrigated,
   b. supporting said elongated pipe by a plurality of vehicles, each vehicle having wheels,
   c. moving said vehicles and said elongated pipe traversely of the pipe's length through the field by moving each vehicle at substantially the same speed, and
   d. supplying water to a supply end of said elongated pipe from a fixed pipe;

the improved method of steering the elongated pipe comprising the steps of:
   e. establishing a guideline along the fixed pipe,
   f. predetermining an operating horizontal distance between the guideline and the supply end,
   g. measuring the actual horizontal distance from the guideline to the supply end,
   h. computing the deviation of the measured actual distance from the operating distance, and hh. moving the elongated pipe axially as well as traversely by
i. simultaneously steering at least some of the wheels responsive to the computed deviation.

4. The invention as defined in claim 3 further comprising:
j. angling the wheels at the ends of the elongated pipe outward to stretch the pipe.

5. In the process of operating an automatic irrigator which includes:
a. releasing water from an elongated pipe upon a field to be irrigated,
b. supporting said elongated pipe by a plurality of vehicles, each vehicle having wheels,
c. moving said vehicles and said elongated pipe traversely of the pipe's length through the field,
d. supplying water to a supply end of said elongated pipe from fixed pipe;
dd. also moving the elongated pipe along and at a cetain angle to the fixed pipe,
e. establishing a guideline along the fixed pipe,
f. predetermining a preferred distance between the elongated pipe and the guideline, and
g. determining the deviation of the preferred distance from the actual distance between the elongated pipe and the guideline,
the improved method of controlling the vehicles to reduce the deviation comprising the steps of:
h. conditioning a controller responsive to the deviation,
i. connecting a steering link from the controller to vehicles to be controlled,
j. controlling the vehicles by the condition of the steering link,
k. activating the controller responsive to the condition of the controller and to the condition of the steering link, and
l. changing the condition of the steering link responsive to activation of the controller.

6. The invention as defined in claim 5 further comprising:
m. conditioning the steering link a predetermined amount each time the controller is activated.

7. The invention as defined in claim 6 wherein the controlling step is by:
n. simultaneously steering the wheels of some of the vehicles, and
o. angling the end wheels outward to stretch the pipe.

8. An irrigator having
a. an elongated pipe having a guide end, said pipe adapted to dispense water upon the field to be irrigated,
b. a plurality of vehicles supporting said elongated pipe,
c. ground engaging wheels on each vehicles journaled to
d. an axle attached to
e. a king pin journaled in
f. an upright tube on the vehicle,
ff. the wheels on the vehicles at the ends of the pipe angled outward to stretch the pipe,
g. power means attached to the wheels for moving all of the wheels at substantially the same speed and thus the elongated pipe, and
h. an established guideline, transverse of the elongated pipe and near the guide end thereof,
wherein the improvement comprises the structures for steering the elongated pipe comprising in combination:
i. a guide in the guideline,
j. means attached to the guide for moving the guide along the guideline,
k. a controller mounted on the elongated pipe,
l. sensor means connecting the guide to the elongated pipe for changing the controller responsive to the distance of the guide from the guide end,
m. a steering link extending along the elongated pipe to several of the vehicles,
n. steering means interconnecting the steering link and king pin on several of the vehicles to steer the wheels of those vehicles, and
o. means for changing the steering link responsive to the condition of the controller.

9. The invention as defined in claim 8 wherein:
p. said steering link is in the form of a steering cable,
q. a bridge tube attached to the cable,
r. bridges on the bridge tube with spaces between the bridges,
s. a microswitch on the controller electrically connected to
t. a motor which is connected to the cable to move the cable and bridge tube, and
u. a switch arm on the microswitch in operative relationship to the bridges and spaces on the bridge tube.

10. The invention as defined in claim 9 further comprising:
v. a steering arm connected to the king pin,
w. a tie rod connected to the steering arm, and
x. mechanical transmission means for moving the tie rod responsive to movement of the cable.

11. The invention as defined in claim 10 wherein said mechanical transmission includes:
y. a helix tube telescoped over the tie rod,
z. a steering sheave coaxial with the helix tube and tie rod attached to the helix tube, and
aa. a splice cable on the above said steering cable wrapped around the steering sheave.

* * * * *